(12) United States Patent
Lagorgette et al.

(10) Patent No.: US 11,283,371 B2
(45) Date of Patent: Mar. 22, 2022

(54) ROTATING PIEZOELECTRIC MOTOR FOR DISCS

(71) Applicant: ETA SA Manufacture Horlogere Suisse, Grenchen (CH)

(72) Inventors: Pascal Lagorgette, Bienne (CH); Pascal Meyer, Neuchatel (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 464 days.

(21) Appl. No.: 16/275,362

(22) Filed: Feb. 14, 2019

(65) Prior Publication Data

US 2019/0280624 A1    Sep. 12, 2019

(30) Foreign Application Priority Data

Mar. 9, 2018 (EP) .................................. 18160983

(51) Int. Cl.
*H02N 2/10* (2006.01)
*G04C 3/12* (2006.01)
*H02N 2/00* (2006.01)

(52) U.S. Cl.
CPC ............... *H02N 2/103* (2013.01); *G04C 3/12* (2013.01); *H02N 2/001* (2013.01)

(58) Field of Classification Search
CPC .......... H02N 2/103; H02N 2/001; H02N 2/10; H02N 2/12; G04C 3/12
See application file for complete search history.

(56) References Cited

U.S. PATENT DOCUMENTS

| 6,323,578 | B1 | 11/2001 | Suzuki et al. | |
| 6,768,245 | B2 * | 7/2004 | Mock | H02N 2/001 |
| | | | | 310/323.02 |
| 2002/0033651 | A1 | 3/2002 | Iarochenko et al. | |
| 2012/0269043 | A1 * | 10/2012 | Baudet | G04C 5/005 |
| | | | | 368/126 |
| 2013/0279302 | A1 * | 10/2013 | Vardi | G04C 5/005 |
| | | | | 368/126 |
| 2014/0340998 | A1 * | 11/2014 | Funk | G04B 19/048 |
| | | | | 368/80 |

FOREIGN PATENT DOCUMENTS

FR    1 352 079    2/1964
WO    WO 02/25801 A1    3/2002

OTHER PUBLICATIONS

European Search Report dated Sep. 25, 2018 in European Application 18160983.5, filed on Mar. 9, 2018 ( with English translation of categories of Cited Documents).
Chinese Office Action dated Dec. 8, 2020 in Chinese Patent Application No. 201910175486.5, 4 pages.

* cited by examiner

*Primary Examiner* — Emily P Pham
(74) *Attorney, Agent, or Firm* — Oblon, McClelland, Maier & Neustadt, L.L.P.

(57) ABSTRACT

A rotating piezoelectric motor including a piezoelectric actuator including a resonator having a pair of arms connected at one of their ends in a connection area, the other two ends being referred to as 'free', a passive element able to be driven in rotation by the friction of the free ends on the passive element, the passive element including a disc and a rim extending from the periphery of the disc, the rim passing between the free ends of the arms.

14 Claims, 1 Drawing Sheet

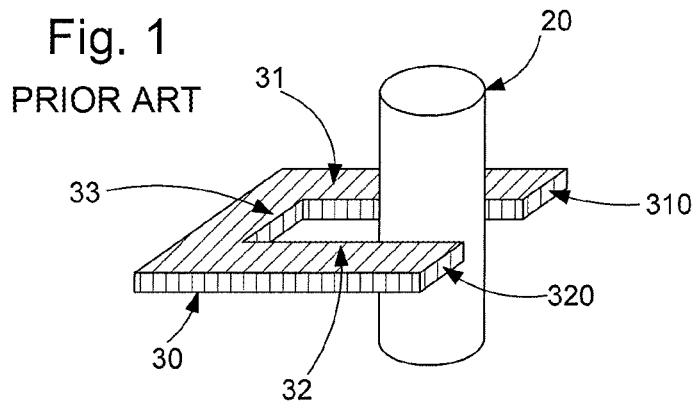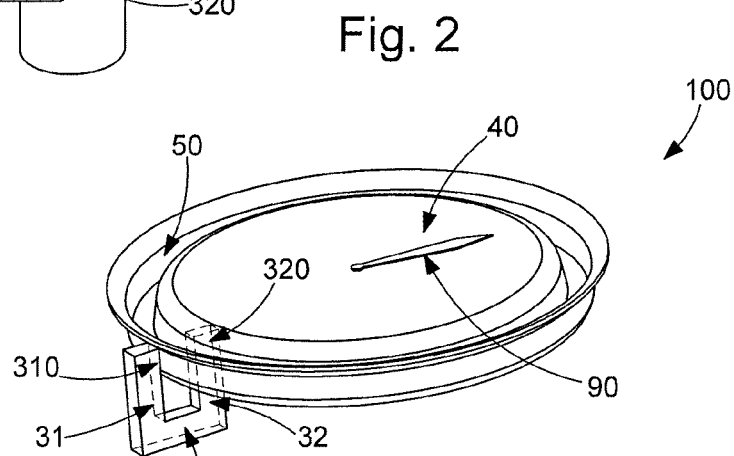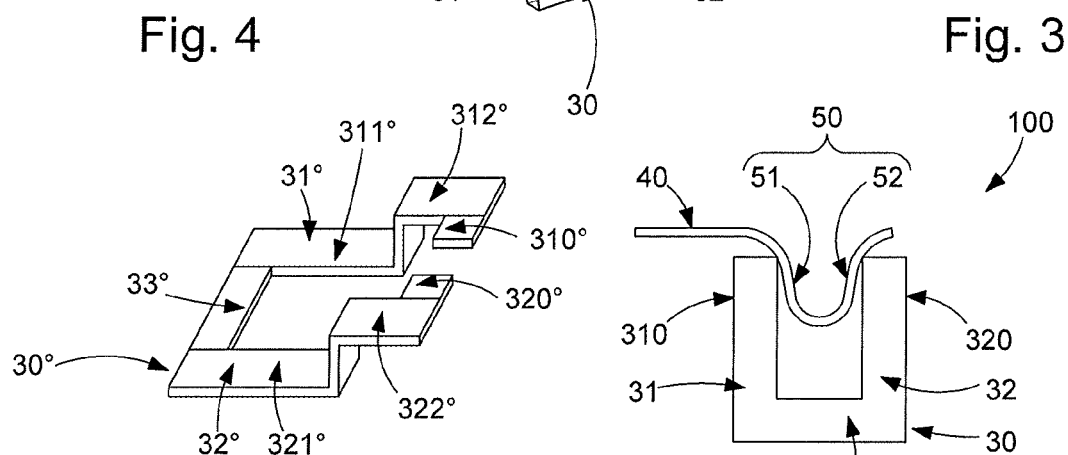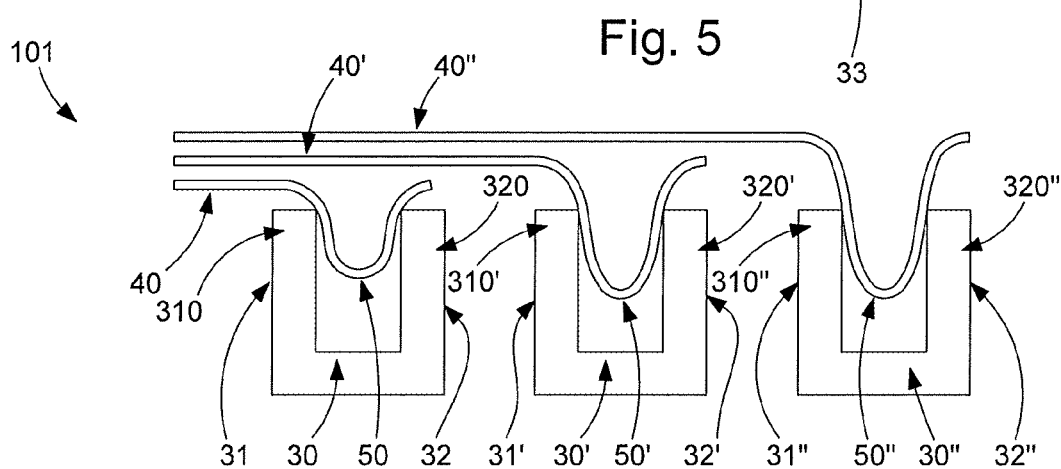

ROTATING PIEZOELECTRIC MOTOR FOR DISCS

CROSS-REFERENCE TO RELATED APPLICATION

This application claims priority to European Patent Application No. 18160983.5 filed on Mar. 9, 2018, the entire disclosure of which is hereby incorporated herein by reference.

FIELD OF THE INVENTION

The invention relates to the technical field of rotating piezoelectric motors.

BACKGROUND OF THE INVENTION

A rotating piezoelectric motor conventionally has a passive element and an actuator for rotating the passive element using the piezoelectric effect. Referring to FIG. 1, there are known, in particular, rotating piezoelectric motors 10 in which the passive element 20 comprises a cylinder and the piezoelectric actuator comprises a resonator 30 having a pair of arms 31, 32 connected to each other in a substantially tuning fork-shaped or U-shaped connection area 33. The piezoelectric actuator further includes two piezoelectric elements (not represented), each attached to one of arms 31, 32, and acting as excitation means for the arms to impart vibrations thereto. Passive element 20 passes between resonator arms 31, 32. More specifically, one area of the lateral surface of passive element 20 is in contact, on both sides, with the free ends 310, 320 of arms 31, 32, so that passive element 20 is rotated by the friction of free ends 310, 320 of arms 31, 32 on the contact area.

In some applications, particularly horological applications, it might be desirable for the piezoelectric actuator described above to be able to drive in rotation a disc and not a cylinder.

SUMMARY OF THE INVENTION

It is an object of the present invention to propose a rotating piezoelectric motor in which the piezoelectric actuator comprises a resonator having a pair of arms and the passive element includes a disc able to be driven in rotation by said actuator.

To this end, according to a first aspect, the invention relates to a rotating piezoelectric motor including:
  a piezoelectric actuator comprising a resonator having a pair of arms connected at one of their ends in a connection area, the other two ends being referred to as 'free',
  a passive element able to be driven in rotation by the friction of the free ends on the passive element,
the passive element comprising a disc and a rim, the rim extending from the periphery of the disc and passing between the free ends of the arms.

A "disc" means a round element that is solid or contains hollow portions. It may, for example, be a date disc, a moon phase disc, etc.

Such a motor comprises few components, is compact and the high available torque makes a high rotational speed of the disc possible.

In one embodiment, the rim has a substantially U-shaped radial cross-section so that both the arms of the U rest on the free end of an arm. In other words, the rim has a folded over portion.

This makes it possible to apply a preload at the interface between the piezoelectric actuator and the passive element, in order to set the holding torque without powering the motor, i.e. without exciting the arms.

According to a second aspect, the invention relates to an assembly comprising at least two piezoelectric motors according to the first aspect, the discs of the passive elements of the piezoelectric motors being concentric, superposed and of different diameters, each disc, except the disc of smallest diameter, covering the discs of smaller diameter.

It is understood that the resonators of the active elements are positioned at different distances form the axis of the discs but in the same plane: it is therefore possible to drive in rotation several discs without taking up too much space. A position detection system can easily be integrated ensuring synchronization of the discs at any time.

According to a third aspect, the invention relates to a timepiece comprising a piezoelectric motor or an assembly of at least two piezoelectric motors as detailed above.

In a non-limiting embodiment, the timepiece includes a hand fixed to one end of the cylindrical part.

BRIEF DESCRIPTION OF THE DRAWINGS

Other features and advantages will appear clearly from the following description, given by way of non-limiting illustration, with reference to the annexed drawings, in which:

FIG. 1, already described, schematically represents a part of a rotating piezoelectric motor according to the prior art, wherein the element to be driven in rotation is a cylinder.

FIG. 2 schematically represents a part of a rotating piezoelectric motor according to a first embodiment of the invention, wherein the element to be driven in rotation is a disc, FIG. 3 schematically represents an area of the rotating piezoelectric motor of FIG. 2 in radial longitudinal section, FIG. 4 schematically represents a resonator of a rotating piezoelectric motor according to a second embodiment of the invention, FIG. 5 schematically represents an assembly of rotating piezoelectric motors like that of FIG. 2, in radial longitudinal section.

DETAILED DESCRIPTION OF PREFERRED EMBODIMENTS

A rotating piezoelectric motor according to the invention has a passive element comprising a disc 40 and a piezoelectric actuator for rotating disc 40 using the piezoelectric effect.

In a first embodiment of the invention described with reference to FIGS. 2 and 3, the piezoelectric actuator includes piezoelectric excitation means (not represented) and a resonator 30 including two arms 31, 32 able to oscillate. The excitation means are advantageously formed of two parts, each attached to a different arm. However, other embodiments of the excitation means are possible; they may, for example, be formed of a single part arranged at a joint between the arms. When a suitable voltage is applied to the excitation means, the excitation means deform, and mechanical stresses are transmitted to arms 31, 32, which then start to oscillate. If the excitation means are designed and mounted in a suitable manner on the arms, multi-dimensional oscillations of the desired form can be achieved.

Arms 31, 32 are connected in a connection area 33, and extend substantially parallel to each other from said connection area 33. Resonator 30 is therefore generally tuning fork-shaped, i.e. U-shaped. However, other shapes can be envisaged. The ends of the arms that are not connected to connection area 33, are referred to as free ends 310, 320. The amplitude of the oscillations of arms 31, 32 is maximum at these ends 310, 320.

The passive element also includes a rim 50 extending over the entire periphery of disc 40. Rim 50 is formed of two parts: a first part is connected to disc 40, a second part is connected only to the first part. The first part and the second part form together a circular groove surrounding disc 40. In other words, rim 50 has a U-shaped cross-section, along a radial longitudinal section of the passive element, and disc 40 is connected to one of the ends of the U. The branch of the U connected to disc 40 is referenced 51 and the other branch of the U is referenced 52.

Rim 50 passes locally between the free ends 310, 320 of arms 31, 32. More precisely, branch 51 rests against free end 310 of arm 31, and branch 52 rests against free end 320 of arm 32, thereby creating a radial preload between resonator 30 and the passive element, the term 'radial' referring to a radius of disc 40.

It is understood that the multi-dimensional oscillations of free ends 310, 320 of arms 31, 32 make it possible to impart a rotation to disc 40 about its axis by the friction of said ends 310, 320 against rim 50.

It is noted in the embodiment shown in FIG. 2 that resonator 30 extends orthogonally to disc 40, i.e. the plane containing the axes of arms 31, 32 of resonator 30 is parallel to the plane defined by disc 40. However, any technically possible inclinations of resonator 30 relative to disc 40 can be envisaged. Naturally, the smaller the inclination, the thinner the piezoelectric motor will be, which is paramount in the field of horology.

Moreover the resonator is not limited to a U-shape or tuning fork shape. In particular, in a second embodiment described with reference to FIG. 4, the arms might not be rectilinear. Such a resonator 30° has two arms 31°, 32°. Said arms 31°, 32° are connected in a connection area 33°. Each arm 31°, 32° includes a main branch 311°, 321°, a free end 310°, 320°, and a connection area 312°, 322° for connecting main branch 311°, 321° and free end 310°, 320°.

Main branches 311° 321° extend substantially parallel to each other from said connection area 33°. Connection area 33° and the two main branches 311°, 321° are on the same level, i.e. the axes of connection area 33° and the axes of the two main branches 311°, 321° lie in the same plane.

However, free ends 310°, 320° extend on a different level, and the plane containing the axes of free ends 310° 320° is parallel to the plane of main branches 311°, 321° mentioned in the preceding paragraph. In the embodiment represented in FIG. 4, connection areas 312°, 322° each include a portion extending orthogonally to main branches 311° 321°, such that free ends 310°, 320° are brought to a different level to that of main branches 311°, 321°. However, connection areas 312° 322° could also be of any other shape, the essential point being that the resonator has two levels.

Free ends 310° 320° extend towards one another and opposite one another, and rim 50 passes between said free ends 310°, 320°. More precisely, branch 51 rests against free end 310° of arm 31°, and branch 52 rests against free end 320° of arm 32°. The piezoelectric actuator comprises piezoelectric excitation means (not represented). The excitation means are advantageously formed of two parts, each attached to one of free ends 310°, 320°. When a suitable voltage is applied to the excitation means, the excitation means deform, and mechanical stresses are transmitted to free ends 310°, 320°, which then start to oscillate. If the excitation means are designed and mounted in a suitable manner on the arms, multi-dimensional oscillations of the desired form can be achieved. The multi-dimensional oscillations of free ends 310°, 320° of arms 31°, 32° make it possible to impart a rotation to disc 40 about its axis by the friction of said ends 310°, 320° against rim 50.

Disc 40 is, for example, integral in rotation with a hand 90, as for example represented in FIG. 2, which makes the piezoelectric motor according to the invention particularly suitable for timepieces, due to its simplicity and compactness. The disc could alternatively be a date disc, a moon phase disc, or any other type of disc used in the field of horology.

FIG. 5 shows an assembly 101 of piezoelectric motors like that described with reference to FIGS. 2 and 3, although their resonators could be of the type described with reference to FIG. 4. Each motor comprises a resonator 30, 30', 30" and a passive element. Each resonator 30, 30', 30" comprises a first arm 310, 310', 310" and a second arm 320, 320', 320". Each passive element comprises a disc 40, 40', 40" and a rim 50, 50', 50".

Discs 40, 40', 40" are concentric and superposed. Discs 40, 40', 40" are of different diameters so that each disc 40', 40" covers a disc of smaller diameter 40, 40', except the disc of smallest diameter 40. Each rim 50, 50', except rim 50" joined to the disc of largest diameter 40", is covered by a disc of larger diameter 40', 40" than that to which rim 50, 50' is joined, such that the groove that it defines is covered by said disc of larger diameter 40', 40". It is understood that with this arrangement rims 50, 50' 50" do not interfere with each other.

Each resonator 30, 30', 30" locally clamps the associated rim 50, 50', 50". In the embodiment shown in FIG. 5, resonators 30, 30', 30" are placed side by side, i.e. in the same angular position with respect to discs 40, 40', 40". However, there is nothing to prevent them being arranged in different angular positions from each other.

It will be clear that various modifications and/or improvements and/or combinations evident to those skilled in the art may be made to the various embodiments of the invention set out above without departing from the scope of the invention defined by the annexed claims.

The invention claimed is:

1. A rotating piezoelectric motor comprising:
   a piezoelectric actuator comprising a resonator having a pair of arms connected at one end in a connection area, the other end being referred to as 'a free end',
   a passive element able to be driven in rotation by a friction of the free ends on the passive element,
   the passive element comprising a disc including a first side and a second side opposite to the first side, and
   the passive element comprising a rim extending from a periphery of the first side and the second side of the disc, the rim extending in a direction of the second side, the rim passing between the free end of each arm of the pair of arms, and the free ends of the arms are arranged on the second side of the disc.

2. The rotating piezoelectric motor according to claim 1, wherein the rim has a substantially U-shaped radial cross-section including two branches such that each of the two branches rests on the free end of each arm of the pair of arms.

3. A timepiece comprising the rotating piezoelectric motor according to claim 1.

4. The timepiece according to claim 3, comprising a hand integral in rotation with the disc.

5. An assembly comprising at least two of the rotating piezoelectric motor according to claim 1, the discs of the passive elements of the piezoelectric motors being concentric, superposed and of different diameters, each disc, except the disc of smallest diameter, covering the discs of smaller diameter.

6. A timepiece comprising the assembly according to claim 5.

7. The timepiece according to claim 6, comprising at least two hands such that each disc is integral in rotation with one of the hands.

8. The rotating piezoelectric motor according to claim 1, wherein the connection area extends in a first plane and the free end of each arm of the pair of arms extends in a second plane that is not coplanar with the first plane.

9. The rotating piezoelectric motor according to claim 8, wherein the first plane is parallel to the second plane.

10. The rotating piezoelectric motor according to claim 1, wherein the free end of each arm of the pair of arms extends towards one another.

11. The rotating piezoelectric motor according to claim 1, wherein the disc is a date disc.

12. The rotating piezoelectric motor according to claim 1, wherein the disc is a moon phase disc.

13. A rotating piezoelectric motor comprising:
a piezoelectric actuator comprising a resonator having a pair of arms connected at one end in a connection area, the other end being referred to as 'a free end',
a passive element able to be driven in rotation by a friction of the free ends on the passive element,
the passive element comprising a disc and a rim extending from a periphery of the disc, the rim passing between the free end of each arm of the pair of arms, and
the rim including a substantially U-shaped radial cross-section including two branches such that each of the two branches rests on the free end of each arm of the pair of arms.

14. An assembly comprising:
at least two rotating piezoelectric motors, each motor of the at least two rotating piezoelectric motors including
a piezoelectric actuator comprising a resonator having a pair of arms connected at one end in a connection area, the other end being referred to as 'a free end', and
a passive element able to be driven in rotation by a friction of the free ends on the passive element,
the passive element comprising a disc and a rim extending from the periphery of the disc, the rim passing between the free end of each arm of the pair of arms,
the rim including a substantially U-shaped radial cross-section that includes two branches such that each of the two branches rests on the free end of each arm of the pair of arms, and
the discs of the passive elements of the piezoelectric motors being concentric, superposed and of different diameters, each disc, except the disc of smallest diameter, covering the discs of smaller diameter.

* * * * *